United States Patent Office 3,156,544
Patented Nov. 10, 1964

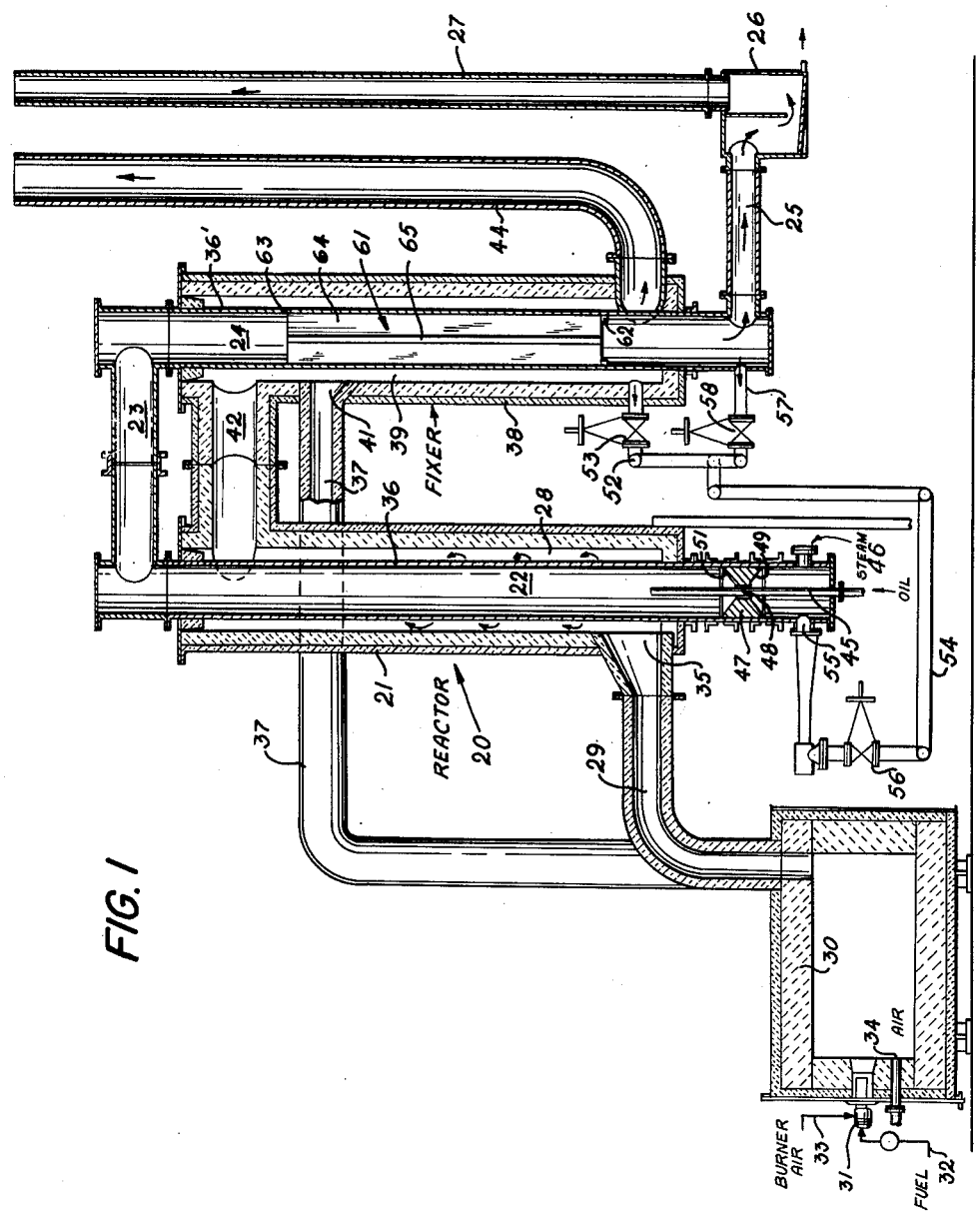

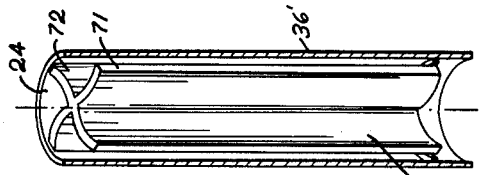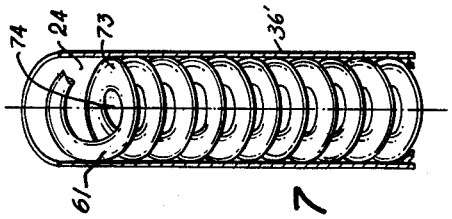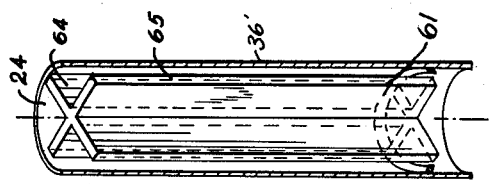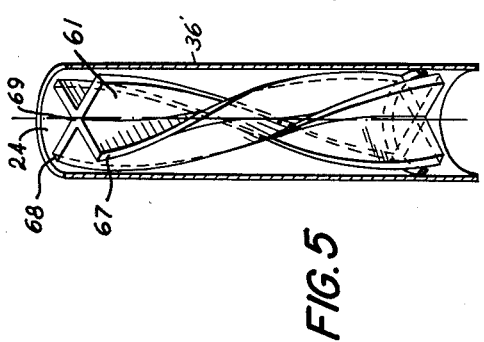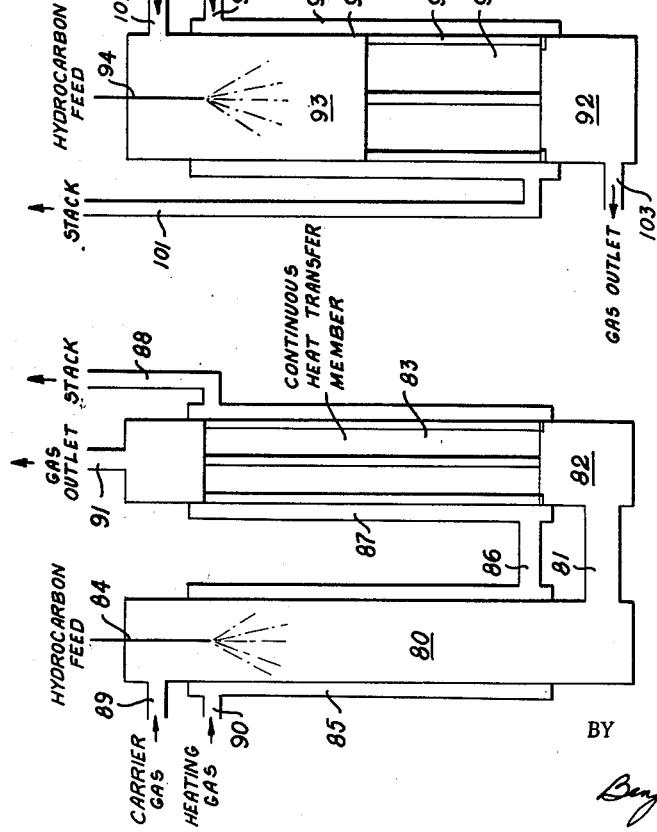

3,156,544
APPARATUS FOR MAKING COMBUSTIBLE GAS
John C. Eck, Convent, and Edward M. Gocze, Avenel, N.J., assignors to Allied Chemical Corporation, New York, N.Y., a corporation of New York
Filed Oct. 1, 1962, Ser. No. 227,348
10 Claims. (Cl. 48—102)

This invention relates to apparatus for the continuous pyrolysis of hydrocarbons and, more particularly, for the continuous production of high B.t.u. oil gas useful as a substitute for natural gas as well as for the production of other gases, including gases employed for chemical purposes.

Conventional oil gas processes involve alternate blasting or heating and make cycles; during the blasting or heating cycle, usually of 3 to 10 minutes' duration, fuel (usually oil) is burned to heat the oil cracking and fixing zones to the necessary temperatures, and during the subsequent make cycle, usually of substantially the same duration as the preceding blasting cycle, oil is cracked in the cracking zone and the oil vapors fixed by passage through the fixing zone. Obviously in such processes gas is made during the make cycles only and the full potential capacity of the equipment is not utilized.

In such heretofore known oil gas processes, the fixing zone is constituted of refractory checkerbrick arranged in rows with the bricks in each row spaced from each other, and with the brick of adjacent rows staggered relative to each other to provide staggered openings for flow therethrough of the make gas or the brick arranged to provide flues extending along the length of the fixing zone for flow of the make gas through such flues. Heat imparted to the checkerbrick during the blasting cycle is employed to fix the make gas passing through the fixing zone during the make cycle, i.e., heat is stored and regenerated directly in the checkerbrick itself and the heat input and the duration of the make cycle can be regulated to obtain the necessary fixing of the make gas.

Continuous oil gas processes have been suggested. The so-called Dayton Process (U.S. Patent 1,506,164) involves the atomization of hydrocarbon oil with a limited amount of preheated air in a hot retort and a combustion of part of the oil to furnish the heat to crack the rest of the oil and produce a gas having a B.t.u. of 450 to 500 and a relatively high gravity; such gas is not a a satisfactory substitute for natural gas.

Another continuous process involves the cracking of oil and the fixing of oil vapors in a plurality of long, relatively small diameter heated tubes, the oil being introduced at the top and the fixed oil gas withdrawn from the bottom of these tubes. Tubes 28 feet long, or longer, and having an inside diameter of about four inches are employed to obtain adequate vaporization, cracking and fixing of the oil gas. Such procedure and equipment is objectionable, among other reasons, because of the maintenance and operational difficulties entialed with the extremely long, small diameter tubes.

A flexible continuous pyrolysis process to make gas of desired gravity and B.t.u., including gas used as a substitute for natural gas, which process can be carried out in equipment such as the conventional two shell water gas equipment with relatively small modification thereof, and which process represents an important and marked advance in the production of combustible gases from available hydrocarbon feeds, is disclosed in copending patent application Serial No. 61,435, filed October 10, 1960, now U.S. Patent No. 3,120,430. The process of this patent application involves the continuous introduction into a substantially unobstructed reaction zone surrounded by an annular heating chamber, of a stream of a heating gas, such as combustion products, into the base of the heating chamber, and flowing the heating gas upwardly through this heating chamber while continuously flowing a stream of carrier gas upwardly through the reaction zone into which is continuously introduced a spray of oil in a downward direction. The stream of carrier gas and oil vapor is withdrawn from the top of the reaction zone and passed downwardly through a fixing zone surrounded by an annular heating chamber through which is passed in a direction countercurrent to the flow of the make gas through the fixing zone, the heating gases exiting from the top of the annular heating chamber surrounding the reaction zone and entering the base portion of the annular heating chamber surrounding the fixing zone. The fixing zone contains a plurality of layers of spaced checkerbrick or packing suitably arranged for flow of the make gas thereover.

Experience with the process has indicated that with very heavy feed stocks there is some tendency to develop carbon deposits in the interstices between the checkers, requiring careful watch over the operation and from time to time, as required, a blast of steam to remove the deposit.

It is a principal object of the present invention to improve equipment for producing the continuous process of the aforesaid copending application, particularly from the standpoint of obtaining better fixing of the make gas.

It is another object of this invention to provide novel apparatus of unique simplicity of design, construction and operation for the practice of the continuous process for the pyrolysis of hydrocarbons which apparatus can be used to make gas of desired B.t.u. and gravity from available hydrocarbon feeds, such as gas oils; low grade hydrocarbon oils, such as heavy cracked bottoms having a Conradson carbon number in excess of 6; the so-called H-fuel, a naphtha consisting chiefly of branched chain hexanes and heptanes; and hydrocarbon gases, such as propane, butane, etc.

Other objects and advantages of the present invention will be apparent from the following detailed description thereof.

In accordance with this invention, the fixing of the make gas produced by the pyrolysis of hydrocarbons is effected by passing the make gas through a fixing zone in indirect heat exchange relation with a heating gas such as combustion gases, which fixing zone contains, instead of the usual rows of packing or checkerbrick, a continuous heat transfer member of good thermal conductivity extending from the walls or from near the walls of the fixing zone. through which walls heat passes into the fixing zone, to the axis of the fixing zone and for substantially the full length or height of the fixing zone to transfer heat freely towards and to the interior of that zone where it is available for transfer by convection and radiation to make gas passing therethrough. The continuous transfer member is of good thermal conductivity material, such as carbon steel, stainless steel or nickel, and is shaped to provide a surface area over which the make gas sweeps, which area is relatively large in comparison to the cross-sectional area of the fixing zone and yet not to interpose appreciable obstruction to the flow of the make gas through the fixing zone over the continuous heat transfer material therein. By continuous is meant that the heat transfer material is in the form of solid uninterrupted plate or plates extending from or from near the wall defining the fixing zone through which heat is conducted to the central portion or axis of the fixing zone so that heat supplied through the walls is made uniformly available for the fixing process throughout the length and width of this zone. Preferred is a spiral or lengthwise finned or vaned member of good thermal conductivity, having a plurality of spaced fins or vanes extending from the longitudinal axis of the fixing member, which axis is coaxial with that of the fixing zone, with the ends of the fins or vanes extending as close as practical to the fixing walls through which heat is conducted from the heating medium supplying heat to the fixing zone and with the fins or vanes radially arranged, say, 30 to 90 degrees apart to provide a continuous heat transfer member for substantially the full length of the fixing zone over which the make gas sweeps.

With the fixer construction of the present invention, heat is transmitted efficiently from the walls defining the fixing zone throughout the volume of the fixing zone resulting in steady state operation with good fixing of the make gas. This is chiefly due to the continuous heat transfer members of good thermal conductivity extending from the walls or near the walls defining the fixing zone through which heat is imparted to the fixing zone throughout the cross-sectional area of the fixing zone, e.g., from the opposite walls to the axis thereof, and designed to have portions thereof, such as vanes or fins, spaced apart in a radial direction so that the fixer is divided for flow of the make gas therethrough in streams of relatively small cross-sectional extent as compared with the cross-sectional area of the fixer, with consequent good heat transfer to the make gas from the heating gas and the efficient conversion of the make gas into relatively incondensible gases.

In accordance with a preferred embodiment of this invention, continuous pyrolysis of the hydrocarbon feed is effected by continuously introducing and flowing the hydrocarbon gas or liquid feed to be pyrolyzed along with a carrier gas through a reaction zone cocurrent with the flow of a heating medium in indirect heat exchange relation with this reaction zone where cracking of the hydrocarbons (and vaporization of liquid hydrocarbon feed) take place. The resulting make gas is passed through a fixing zone having the continuous heat transfer member therein, which fixing zone is heated by a heating gas passing over the heat transfer walls defining the fixing zone with flow of the heating gases and the make gas in a cocurrent direction. Thus the heating gas is introduced at its maximum temperature into heat exchange relation with the portion of the reaction zone where vaporization and cracking of the feed are initiated and where the greatest heat input is required. The heating gases are thus cooled and enter the heating chamber for the fixing zone at the inlet end of this zone where a balanced heat input is required for the endothermic reactions which take place in the fixing zone. If desired, the heat input at the inlet end of the fixing zone can be augmented by the supply of combustion gases directly from the combustion chamber to the inlet end of the heating chamber for the fixing zone. The heating gas leaves at the exit end of the fixing zone at a relatively low temperature. The fixed make gas is also withdrawn at the same end where for optimum operations the temperature should be appreciably lower than at the inlet end of the fixing zone where it is necessary to supply the heat to initiate the fixing reactions, which are endothermic reactions, chiefly cracking of the partially cracked oil vapor to produce low molecular weight compounds and radicals, chiefly hydrogen, methane and $C_2$ and $C_3$ hydrocarbons, usually with small amounts of aromatics, carbon monoxide and carbon dioxide.

In the accompanying drawings which show for purposes of exemplification preferred forms of the apparatus embodying this invention to which forms, however, the invention is not to be limited, FIGURE 1 is a vertical section of a preferred embodiment of gas generating apparatus exemplifying the present invention;

FIGURE 2 is a diagrammatic representation of another arrangement of apparatus embodying this invention and for practicing the process of this invention;

FIGURE 3 is a diagrammatic vertical section showing still another embodiment of the apparatus of this invention in which the process can be carried out;

FIGURE 4 is a perspective view of one form of continuous heat transfer member which can be employed in the fixing zone of the fixers of the disclosed apparatus;

FIGURE 5 is a perspective view of another form of heat transfer member which can be used in the fixers of the disclosed apparatus;

FIGURE 6 is a perspective view of still another form of such continuous heat transfer member; and FIGURE 7 is a perspective view of still another form of such continuous heat transfer member.

It will be understood that the showings of the drawings are not to scale and that the heat transfer members in each case are dimensioned so that the outer walls thereof extend in near contact or, where the materials of construction permit, actual contact with the heat transfer walls defining the fixing zone through which heat is imparted to the fixing zone from the heating gases passing continuously over these heat transfer walls as hereinafter more fully described.

Referring to FIGURE 1 of the drawings, the reactor 20 is constituted of a refractory lined chamber 21 having therein a reactor tube 22 communicably connected by conduit 23 with fixer tube 24. A conduit 25 leads from the base of the fixer tube 24 into wash box 26, equipped with a gas outlet 27. The dimensions of the reactor tube 22 and fixer tube 24 and their associated refractory lined chambers will, of course, depend on the desired capacity of the gas making plant. The reactor tube 22 should have a volume sufficient to effect vaporization of the hydrocarbon feed introduced in the liquid phase and for the cleavage or cracking reactions of the hydrocarbons initiated. The fixer tube 24 should have a sufficient volume for completion of the cleavage and cracking reactions initiated in the reactor tube to produce a fixed gas containing relatively small amounts of condensibles which condense out of the gas as it passes through the wash box. In general, a reactor and fixer, having refractory lined chambers, the internal diameter of which is from about 3 to about 15 feet and a height of from about 5 to about 30 feet, and in which the external diameter of the reactor and fixer tube is about ½ to 6 feet less than the internal diameter of the refractory lined chamber containing same, will be found satisfactory.

Reactor tube 22 is disposed in refractory lined chamber 21 to provide an annular flue 28 which communicates through duct 29 with a combustion chamber 30 of any suitable type. The combustion chamber 30 shown in the drawing involves a refractory lined, substantially rectangular chamber equipped with a burner 31 provided with fuel line 32 and air line 33 to support combustion of the fuel which desirably is either a gaseous or liquid fuel. Products of combustion generated in combustion chamber 30 are supplemented with secondary air through line 34 to insure complete combustion and to obtain combustion products of the desired temperature, preferably a temperature within the range of from about 2000° to 3000° F. These combustion products flowing through duct 29 enter through the port 35 tangential to the annular flue 28 into the base of this flue and flow upwardly therethrough as indicated by the arrows in flue 28 in heat exchange relation with the outside of the walls 36 defining the reactor tube 22. Walls 36 of the reactor tube and the walls 36' of the fixer tube can be of silicon carbide, i.e., carborundum, or high temperature resistant metal of good heat conductivity such as Hastelloy (nickel base alloys) or stainless steel. The walls 36 and 36' are made as thin as possible consistent with strength requirements to improve heat transfer from the heating gases passing over these walls.

Combustion chamber 30 preferably, but not necessarily, communicates through a pipe 37 with the top of the refractory lined chamber 38 in which the fixer tube 24 is positioned spaced from the lining to form an annular flue 39. Pipe 37 enters near the top of flue 39 through a port 41 which is positioned tangentially to the flue 39 so that the entering hot combustion gases flow in a substantially spiral path through the flue 39. The hot gases entering through port 41 mix with the heating gases passing through the refractory lined flue 42 connecting the top of annular flue 28 with the top of annular flue 39 and serve to provide a heating gas mixture at the inlet end of the fixer tube 24 at a higher temperature than would be the case if combustion products were not supplied directly through port 41 from the combustion chamber 30. Employing the pipe 37 to supply the combustion products to the upper portion of flue 39 near the inlet end of the fixing zone in fixer tube 24 the temperature in the upper portion of the flue 39 where the hot combustion products enter this flue directly from the combustion chamber is within the range of from 1900° to 2600° F.; usually the temperature of the mixed heating gases in the area of flue 39 adjacent port 41 is from about 50° to 100° F. below the temperature of the heating gases at the base of flue 28 where the combustion products from combustion chamber 30 enter flue 28.

The base of flue 39 is provided with a stack 44 through which the heating gases exit from annular flue 39. This stack may communicate with a waste heat boiler (not shown).

Reactor tube 22 is provided at its base with a feed line 45 through which the hydrocarbon feed, e.g., oil, is supplied to the reactor. Steam line 46 supplies steam, as carrier gas. Desirably steam, at a temperature of from 350° to 1400° F., is employed when oil is used as the hydrocarbon feed and oil gas is the desired product. For equipment in which low grade heavy oils, such as bunker-C oils or cracked residium, are supplied through feed line 45, a flow controller 47 similar to a venturi is formed near the base of reactor tube 22 just below the exit of feed line 45. Flow controller 47 can be of Carborundum brick or other suitable high temperature refractory material. It has a central port 48 having downwardly flared walls 49 below this port and upwardly flared walls 51 above this port. This flow controller is employed when heavy oil is used as the hydrocarbon feed, although it can also be used with gas oils; when using the flow controller 47 carrier gas is introduced into the base of reactor tube 22 below the flow controller.

In the embodiment shown in FIGURE 1, a line 52, flow through which is controlled by valve 53, leads from the base of the flue 39 into line 54 which enters the base of reactor tube 22 through port 55. A valve 56 controls flow through line 54. A make gas line 57 leads from the base of the fixer tube 24 and communicates with line 54. A valve 58 controls flow through line 57. When make gas is employed as the carrier gas, it is withdrawn from the base of the fixer tube 24 through line 57 and introduced into the base of the reactor so that it flows through restricted central port 48 and then flows at a relatively higher velocity through the zone of the reactor where the hydrocarbon feed is introduced to carry unvaporized particles through the reactor insuring complete vaporization within the reactor and preventing accumulation of deposits in the base portion of the reactor. When a make gas of relatively low B.t.u. is desired, combustion products are used as the carrier gas. Such combustion products are withdrawn from the base of the annular flue 39 through line 52 and flow through line 54 through port 55 into the base of the reactor 20, thence through the flow controller 47 to carry unvaporized particles of the hydrocarbon feed from the base portion of the reactor into and through the upper portion, insuring complete vaporization thereof.

Position of the oil feed as shown in FIGURE 1 with the major portion of the oil feed line 45 below the level where the heating gases enter the annular heating flue 28 prevents "vapor locks" developing in the oil feed.

The relative location of the feed line shown in FIGURE 1 also results in efficient vaporization and initiation of the cleavage reactions. With the oil introduced continuously and at a uniform rate, depending on the capacity of the installation, at the point in reactor tube 22 of maximum temperature, i.e., where the entering combustion products first gave up their heat to the reactor tube 22, smooth and efficient operation takes place in the reactor tube.

In accordance with this invention, fixer tube 24 is provided with a continuous heat transfer member 61 of good thermal conductivity, namely, metal such as carbon steel, stainless steel or nickel. This continuous heat transfer member 61 is supported by suitable support 62 extending from the walls 36' of the fixer tube 22 near the base thereof, i.e., just above the level of the exit of the heating gases from the annular flue 39 to a level 63 near the top of the annular flue 39 where the heating gases enter. Thus heat transfer member 61 extends throughout substantially the full length of the fixing zone within fixer tube 24.

In the embodiment shown in FIGURES 1 and 4, heat transfer member 61 is constituted of two metal plates 64 and 65 at right angles to each other, each of suitable thickness, say about ¼ inch when using carbon steel; heat transfer members containing more than two intersecting plates or otherwise shaped, as hereinafter disclosed, can be used instead of the structure shown in FIGURES 1 and 4. These plates extend from near contact or contact with the inner walls 36' of fixer tube 24 completely across the cross-sectional area of the fixer, in effect dividing the fixing zone into four like areas extending substantially the full length of the fixing zone, each area approximately 90 degrees in cross-sectional extent and each area being bounded by the continuous walls 64, 65 which intersect at the longitudinal axis of the fixing zone and the heat transfer wall 36' of the fixer tube 22. Thus the heat transfer plates 64 and 65 provide for a continuous path of good thermal conductivity for flow of heat from the heated walls 36' to which heat is continuously supplied by the heating gases passing thereover in the annular flue 39 to make gas flowing in direct heat exchange relation with plates 64 and 65 so that good heat transfer by conduction, convection and radiation is effected throughout the entire volume of the fixing zone including the central area thereof.

In the embodiment of the invention shown in FIGURES 1 and 4 the continuous heat transfer member 61 in effect consists of a central core, i.e., where the plates 64 and 65 intersect, from which radiates four fins 90 degrees apart, which fins are flat, straight walls of good heat conducting material extending from the central core or axis to or near the heat transfer wall 36' of the fixer and each being of a length substantially equal to the length of the fixing zone. When the material of construction of the walls 36' and of the continuous heat transfer member are different, it is desirable to provide a small space or clearance between the ends of the fins and the inner surface of wall 36' to accommodate differential expansion and contraction which may take place in the fixer when starting up the equipment from ambient temperature conditions to operating temperature conditions. In constructions utilizing a heat transfer member of good thermal conductivity having the same co-efficient of expansion as the material of the walls 36', the fins may be positioned in actual contact with the inner surface of the wall 36'.

FIGURE 5 shows a modified form of heat transfer member 61 in which the fins 67 and 68 intersect at the longitudinal axis 69 and are shaped to provide four spiral paths of flow for the make gas through the fixer tube, with each of the four resultant spiral streams of make gas flowing in direct heat exchange relation with the surfaces of the fins 67 and 68. Fins 67 and 68 are spiralled in a lengthwise direction, i.e., the same as the direction of flow through the fixer tube 24.

In the modification of FIGURE 6, the heat transfer member 61 has fins 71 and 72 intersecting at right angles to each other and curved rather than straight and flat as in the case of the continuous heat transfer member of FIGURE 4.

In FIGURE 7 another modification is shown in which the continuous heat transfer member 61 consists of a spiral coil 73 made of good heat conducting metal ribbon, shaped in spiral coil form and positioned in the fixing zone to extend substantially the full length thereof with the periphery of the spiral coil disposed spaced from walls 36' to provide a path of flow for the make gas over and through the spiral coil, thus providing continuous heat transfer paths from walls 36' throughout the cross-sectional area of the fixing zone. The central opening 74 in the coil 73 is of relatively small diameter with respect to the width of the ribbon from which the coil is made, thus insuring good heat transfer throughout the cross-sectional area of the fixer. While FIGURES 4, 5, 6 show 4 plates at 90° to each other, the number of plates can be varied, as desired, and as many as 12 plates, desirably equi-spaced, can be used, dependent on the cross-sectional area of the fixer tube.

In operation of the equipment of FIGURE 1, combustion products from combustion chamber 30 enter continuously through port 35 at a temperature of from 2000° to 3000° F., flow upwardly through the flue 28, through connecting flue 42, into the top of flue 39. The temperature of the gases entering flue 39 is from 1500° to 2400° F. Upon admixture of these gases with additional combustion products admitted through port 41, the temperature of the resultant mixture is from 1500° to 2400° F. The heating gases flow downwardly through flue 39, exiting through the stack 44. The flow, of course, is continuous.

Oil or other hydrocarbon feed is admitted through line 45 along with the carrier gas, preferably steam, through line 46, but which can be combustion products withdrawn through line 52 and introduced through port 55 into the base of the reactor tube 22, or make gas withdrawn through line 57 from the base of fixer tube 24 and introduced through port 55 into the base of reactor tube 22, or a mixture of steam and either combustion products or make gas. The oil or other hydrocarbon feed is vaporized at the base of the reatcor where the temperature is from 1200° to 1800° F. The carrier gas sweeps the vapors thus produced and any unvaporized material up through the reactor tube 22. Oil desirably is introduced under pressure of from 50 to 200 p.s.i.g.; the amount will, of course, depend upon the capacity of the equipment and the desired B.t.u. of the make gas. Instead of oil or along with the oil, hydrocarbon gases such as propane, butane, pentane, mixtures thereof, or lighter hydrocarbon fractions, such as H-fuel which is a naphtha consisting of branched chain hexanes and heptanes, can be introduced through the feed line 45.

The flow of the hydrocarbon vapors and gases thus is upwardly through reactor tube 22 cocurrent with the direction of flow of the heating gases through flue 28. Thus the hydrocarbon feed is introduced at the point where the temperature of the heating gases is highest. The vaporization and cracking reactions being endothermic, maximum heat is supplied at the point where the reactions are initiated and the temperature gradient in the make gas stream flowing through the reactor tube 22 is in the same direction as that of the heating gases flowing through heating flue 28. The make gas produced in reactor tube 22 flows through duct 23 into the top of fixer tube 24 and downwardly over the continuous heat transfer member 61 therein cocurrent to the direction of flow of the heating gases through flue 39 supplying the heat through wall 36' to the fixer necessary to effect the fixing of the make gas. Thus make gas is subjected at the inlet end of the fixing zone to the maximum temperatures prevailing flue 39 supplying the heat to the inlet end of the fixing zone, and the make gas flows through the fixing zone cocurrently with the flow of the heating gases through the flue 39. With this flow arrangement and the continuous heat transfer member of good thermal conductivity, efficient fixing of the make gas takes place, evidenced by the production of oils and tars condensed out of the make gas when subjected to the usual gas purification treatments of substantially the same type and character as is produced employing conventional intermittent operation involving alternate blasting and make cycles and where the heat input to the checkerbrick employed for fixing the make gas is controlled to give optimum fixing. The present invention thus results in the same quality gas produced by such well known intermittent techniques and has the definite advantages that it results in continuous production with consequent markedly greater capacity for a given size installation.

FIGURE 2 shows schematically a modified arrangement of continuous gas generating equipment embodying the present invention. In FIGURE 2, 80 is the reactor tube connected through a base duct 81 with a fixer tube 82 having therein a continuous heat transfer member 83 of the type hereinabove disclosed. Hydrocarbon feed is supplied to the reactor tube 80 through a line 84 positioned near the top of this tube. Reactor tube 80 is heated by heating gas flowing continuously through the annular heating flue 85 formed by a refractory lined chamber similar to chamber 21 shown in FIGURE 1. Heating gas from the base of annular flue 85 flows through duct 86 into annular flue 87 surrounding the fixer tube 82; flue 87 can be formed by a refractory lined chamber similar to chamber 38 of FIGURE 1. Flue 87 is provided with a stack 88. Carrier gas is supplied to the reactor tube 80 through line 89 and make gas is withdrawn from the fixer tube 82 through outlet 91. Hot products of combustion are supplied to the inlet end of flue 85 through port 90.

It will be noted that in the equipment of FIGURE 2 the flow of the heating gas through annular flue 85 is cocurrent with the flow of hydrocarbon feed and gas produced therefrom through the reactor tube 80, and the point of hydrocarbon feed introduction in reactor tube 80 is at the inlet end of heating gas supply to flue 85 where the heating gases are at their maximum temperature. Flow through the fixer tube 82 is in an upward direction cocurrent with the flow of the heating gases through the annular flue 87. In the modification of FIGURE 3, the reactor and fixer are combined in one and the same shell 92. 93 is the reaction zone in which hydrocarbon feed is introduced through line 94. 95 is the continuous heat transfer member disposed in the fixing zone 96. The reaction zone 93 and the fixing zone 96 are both in heat exchange relation through wall 97 of good heat conducting material with an annular flue 98 to the top of which heating gas is supplied through a port 99. The heating gas exits from the base of annular flue 98 to a stack 101. The top of the reaction zone 93 is provided with a carrier gas inlet 102 and the base of the fixing zone 96 with a gas outlet 103.

Thus in the embodiment of FIGURE 3, hydrocarbon feed and carrier gas are introduced into the upper portion of the reaction zone 93. Resultant vapors and gases flow downwardly therethrough continuously being swept along by the carrier gas through the fixing zone 96 containing the continuous heat transfer member 95, the fixed gas exiting through outlet 103. Heating gas enters at 99 and flows downwardly through the annular flue 98 cocurrent with the flow through reaction zone 93 and fixing zone 96, the spent hot gases exiting through the stack 101.

The structure of FIGURE 3 can be reversed with the fixing zone above the reaction zone and flow of heating gases through annular heating flue 98 from bottom to top of the single shell rather than top to bottom as shown in FIGURE 3. In either case the flow of the heating gas through the annular heating flues and the flow of vapors and gases through the reaction zone and fixing zone are cocurrent. The fixer, of course, contains a continuous heat transfer member extending the full length thereof which gives the necessary transfer of heat from the continuously flowing heating gases through the walls defining the fixing zone to the partially cracked vapors and gases passing through the fixing zone. The structure of FIGURE 3 can be positioned with its axis horizontally rather than vertically as shown.

The following example is given to illustrate a preferred mode of practicing the process of this invention. In this example temperatures are in degrees Fahrenheit. It will be understood that the invention is not limited to this example.

The example was carried out in equipment of the type shown in FIGURE 1 of the drawing in which the reactor tube 22 and fixer tube 24 had an inside diameter of 16 inches, and the length of each of the reactor tube and fixer tube was approximately 12 feet. The oil used was H-fuel and it was introduced into inlet 45 at the base of the reactor at a pressure of 160 p.s.i.g. 2.5 gallons of oil per minute were fed. Steam was used as the carrier gas at a temperature of 700° F. in amount of 150 pounds per hour.

Combustion products were produced by burning 160 cubic feet of gas of 520 B.t.u. per minute in the combustion chamber. The temperature if the combustion products at the base of flue 28 was 2400°; at the top of this flue the temperature was 1680°. The temperature of the mixed heating gases at the top of the fixer tube 24, i.e., in the area of port 41 was 2245°. The temperature of the heating gases at the base of flue 39 was 1695°. The temperature in reactor 22 where the oil was introduced was 1400°; the temperature at the top of the reactor tube 22 was 1350°. The temperature of fixer tube 24 adjacent the lower end of the continuous heating member 61 was 1465°. The temperature at the exit end of the fixer connection 25 was 1000°.

Make gas having a B.t.u. of 1280, a specific gravity of 0.81 and the following chemical analysis was thus produced in volume of 16.5 M c.f. per hour:

| | Percent |
|---|---|
| $H_2$ | 15 |
| Co | 4 |
| $CH_4$ | 40 |
| $C_2H_4$ | 26 |
| $C_2H_6$ | 4 |
| $C_3$'s | 6 |
| $C_4$'s | 1 |
| $C_5$'s | 4 |
| $CO_2$ | 0 |
| $N_2$ | 0 |

The oils and tars condensed from this gas were the same as obtained from combustible gas produced by conventional intermittent operation with the same H-fuel demonstrating that the fixing of the make gas was excellent in the continuous run carried out embodying the present invention.

Since certain changes in carrying out the continuous gas process and certain modifications in the apparatus which embody this invention can be made without departing from its scope, it is intended that all matter contained in the above description, or shown in the accompanying drawings, shall be interpreted as illustrative and not in a limiting sense.

What is claimed is:

1. Apparatus for making combustible gas, in combination, a reactor having a single inner reactor tube of heat resistant and heat conducting material spaced from the inner walls of said reactor to define an annular heating flue surrounding said tube, the axis of said tube being substantially coincident with that of said reactor, means for continuously supplying hot gases to said annular heating flue and flowing such gases through said flue to heat said tube, means for continuously supplying a gas making medium to said tube, means for continuously supplying a carrier gas to said tube, a fixing chamber having a single inner fixing tube of heat resistant and heat conducting material therein spaced from the inner walls defining an annular heating flue surrounding the inner fixing tube, the axis of said fixing tube being substantially coincident with that of said fixing chamber, the inlet end of said fixing tube communicating with the exit end of said reactor tube, said annular heating flue surrounding said fixing tube communicating with the annular heating flue surrounding the reactor tube for series flow of heating gases through both annular heating flues, a heat transfer member comprising continuous walls of good thermal conductivity material extending throughout substantially the full cross-sectional area of the fixing tube for substantially the full length thereof, and means for withdrawing the fixed gas from the exit end of said fixer tube.

2. Apparatus for making combustible gas, in combination, a reactor having a single inner reactor tube of heat resistant and heat conducting material spaced from the inner walls of said reactor to define an annular heating flue surrounding said tube, the axis of said tube being substantially coincident with that of said reactor, a combustion furnace communicably connected with said annular heating flue, means for continuously supplying a gas making medium to said reactor tube, means for continuously supplying a carrier gas to said reactor tube, a fixing chamber having a single inner fixing tube of heat resistant and heat conducting material spaced from the walls of said fixing tube to define an annular heating flue, the axis of said fixing tube being substantially coincident with that of said fixing chamber, said fixing tube being communicably connected with the reactor tube, said annular flue surrounding said fixing tube being communicably connected with the annular flue surrounding said reactor tube, a duct connecting said combustion furnace with said annular flue surrounding said fixing chamber in the locality where the two annular flues are connected for series flow therethrough, the said annular flues and said inner reactor and fixer tubes being interconnected for cocurrent flow of the combustion products through said flue surrounding the reactor tube and gas through the reactor tube, and flow of combustion products through the flue surrounding the fixing tube and gas through the fixing tube, a heat transfer member comprising continuous metallic walls of good heat conducting material extending throughout substantially the full cross-sectional area and the length of the fixing zone in said fixing tube to effect heat transfer from the combustion products through the continuous metallic walls of said heat transfer member to the gases passing thereover, and means for withdrawing the fixed gas from the exit end of said fixer tube.

3. Apparatus for making combustible gas, in combination, a reactor having a single inner reactor tube of heat resistant and heat conducting material therein spaced from the inner walls of said reactor to define an annular heating flue surrounding said tube, the axis of said tube being substantially coincident with that of said reactor, means for continuously supplying heating gases to the base of said annular heating flue and flowing said gases in an upward direction through said heating flue, a hydrocarbon feed nozzle positioned near the base of said reactor tube, means for continuously supplying a carrier gas to the base of said reactor tube, a fixing chamber comprising a single inner fixing tube spaced from the inner walls of said fixing chamber to define an annular combustion flue surrounding said fixing tube, the axis of said fixing tube being substantially coincident with that of said fixing chamber, the top of said fixing tube being communicably connected with the top of said reactor tube, the top of the first mentioned annular heating flue being communicable connected with the top of said second mentioned annular heating flue, a continuous heat transfer member of good heat conducting metal positioned in said fixing tube extending substantially the full length of the fixing zone in said fixing tube and having continuous heat transfer walls extending from at least near the walls defining said tube across said fixing tube to provide for good heat transfer from the walls of said tube throughout the cross-sectional area of said fixing tube, and means for withdrawing the fixed gas from the exit end of said fixer tube.

4. Apparatus for making combustible gas, in combination, a reactor having a single inner reactor tube of heat resistant and heat conducting material therein spaced from the inner walls of said reactor to define an annular heating flue surrounding said tube, the axis of said tube being substantially coincident with that of said reactor, means for continuously supplying heating gases to the base of said annular heating flue and flowing said gases in an upward direction through said heating flue, a hydrocarbon feed nozzle positioned near the base of said reactor tube, a flow accelerator in said reactor tube below the exit end of said nozzle, means for continuously introducing a carrier gas into said reactor and flowing same through said flow accelerator which effects flow of said carrier gas at increased velocity through said reactor tube, a fixing chamber comprising a single inner fixing tube spaced from the inner walls of said fixing chamber to define an annular heating flue surrounding said fixing tube, the axis of said fixing tube being substantially coincident with that of said fixing chamber, the top of said fixing tube being communicably connected with the top of said reactor tube, the top of the first mentioned annular heating flue being communicably connected with the top of said second mentioned annular heating flue, a continuous heat transfer member of good heat conducting metal positioned in said fixing tube extending substantially the full length of the fixing zone in said fixing tube and having continuous heat transfer walls extending from at least near the walls defining said fixing tube across said fixing tube to provide for good heat transfer from the walls of said tube to the central portion of said tube, and a gas exit main leading from the base of said fixing tube.

5. A fixer for combustible gas comprising, in combination, a refractory lined chamber, a single fixer tube of heat resistant and heat conducting material in said chamber spaced from the refractory lining therein to provide an annular heating flue for the flow of heating gases therethrough in direct heat exchange relation with the walls of said fixer tube, the axis of said fixer tube being coaxial with that of said refractory lined chamber, a continuous heat transfer member in said fixer tube extending substantially the full length of the fixing zone therein and containing at least one continuous wall of good heat transfer metal extending through substantially the full cross-sectional area of the fixing zone to provide good heat transfer from the walls of the fixing zone to the central portion of the fixing zone, throughout the full length thereof and means for withdrawing the fixed gas from the exit end of said fixer tube.

6. Apparatus as defined in claim 5, in which the continuous heat transfer member consists of straight flat metal walls at right angles to each other with the axis of intersection of said walls positioned coaxially with the axis of the fixing zone dividing the fixing zone into four segments each approximately 90 degrees in cross-sectional extent and each defined by continuous heat conducting walls formed by the metal walls and the wall of said fixing zone.

7. Apparatus as defined in claim 5, in which the continuous heat transfer member is composed of metal walls of spiral configuration in a direction along the length of the fixing zone.

8. Apparatus for the continuous production of combustible gas, in combination, (a) at least one shell having a height of from about 5 feet to about 30 feet, and an internal diameter of from about 3 feet to about 15 feet;

(b) a single tube in said shell with the axis thereof substantially coincident with the axis of the shell, the said tube being defined by walls of heat resistant and heat conducting material, the external diameter of said tube being from about ½ foot to about 6 feet less than the internal diameter of said shell to form a substantially annular heating chamber surrounding the walls of said tube for substantially the full height thereof, one portion of said tube constituting a reaction zone, said reaction zone being substantially unobstructed and thus providing a free space for the gasification of the hydrocarbon fluid introduced thereinto, another portion of said tube constituting a fixing zone, the exit end of said reaction zone communicating directly with the inlet end of said fixing zone;

(c) a continuous and unbroken heat transfer surface of good thermal conductivity in said fixing zone extending from the walls of said fixing zone to the axial region of said fixing zone for substantially the full length of said fixing zone;

(d) means for flowing a heating medium continuously through the annular heating chamber;

(e) means for supplying hydrocarbon fluid and a carrier gas to said reaction zone and for flowing the mixture of gas generated in said reaction zone and the carrier gas through the fixing zone over the continuous and unbroken heat transfer surface therein to produce fixed gas; and (f) means for withdrawing the fixed gas from the exit end of said fixing zone.

9. Apparatus for making gas, in combination, (a) a reactor shell having a height of from about 5 feet to about 30 feet, and an internal diameter of from about 3 feet to about 15 feet;

(b) a single inner longitudinally elongated reactor tube in said reactor shell, said reactor tube having an external diameter of from ½ foot to 6 feet less than the internal diameter of the reactor shell to define an annular heating chamber surrounding said reactor tube, said reactor tube being of heat resistant and heat conducting material and the longitudinal axis of said reactor tube being substantially coincident with that of said reactor shell;

(c) a fixer shell having a height of from about 5 feet to 30 feet and an internal diameter of from about 3 feet to about 15 feet;

(d) a single inner longitudinally elongated fixer tube having an external diameter of from about ½ foot to about 6 feet less than the internal diameter of the fixer shell to define an annular heating chamber surrounding said inner fixer tube, the longitudinal axis of said fixer tube being substantially coincident with that of said fixer shell and the walls of said fixer tube being of heat resistant, and heat conducting material;

(e) a heat transfer member comprising continuous metallic walls of good heat conducting material extending throughout substantially the full cross-sectional area and the length of the fixing zone in said fixing tube to effect heat transfer from combustion products passing through the annular heating chamber surrounding the fixer tube through the continuous metallic walls of said heat transfer member to gases passing thereover;

(f) the annular heating chamber surrounding said inner fixing tube being communicably connected with the annular heating cnamber surrounding said inner reactor tube for series flow of heating gases from the annular heating chamber surrounding said reactor tube through the annular heating chamber surrounding the fixing tube;

(g) the upper end of said inner reactor tube being directly communicably connected with the upper end of said fixer tube for flow of make gas from said inner reactor tube over the heat resistant material therein and down through the inner fixer tube;

(h) means for supplying combustion gases to said annular heating chamber surrounding said reactor tube;

(i) a nozzle positioned in said inner reactor tube for supplying hydrocarbon fluid thereto;

(j) means for supplying a carrier gas to said inner reactor tube to sweep make gas produced in said reactor tube out of said reactor tube and pass the resultant mixture of make gas and carrier gas through said inner fixer tube over the heat transfer member therein to produce fixed gas; and (k) means for withdrawing the fixed gas from the lower end of said fixer tube.

10. Apparatus for making gas as defined in claim 9 having a combustion chamber for supplying combustion products to the inlet end of the reactor shell and also to the inlet end of said fixer shell.

References Cited in the file of this patent

UNITED STATES PATENTS

| | | |
|---|---|---|
| 2,079,104 | Brandt | May 4, 1937 |
| 2,206,189 | Hollhouse | July 2, 1940 |
| 2,387,026 | Huntington | Oct. 16, 1945 |
| 2,605,177 | Pearson | July 29, 1952 |
| 2,625,470 | Roberts | Jan. 13, 1953 |
| 2,860,959 | Pettyjohn et al. | Nov. 18, 1958 |

FOREIGN PATENTS

| | | |
|---|---|---|
| 8,182 | Great Britain | June 2, 1894 |
| 8,320 | Great Britain | Sept. 1, 1894 |

UNITED STATES PATENT OFFICE
CERTIFICATE OF CORRECTION

Patent No. 3,156,544                             November 10, 1964

John C. Eck et al.

It is hereby certified that error appears in the above numbered patent requiring correction and that the said Letters Patent should read as corrected below.

Column 7, line 45, for "reatcor" read -- reactor --; line 75, before "flue" insert -- in heating --; column 9, line 28, for "if" read -- of --.

Signed and sealed this 23rd day of March 1965.

(SEAL)
Attest:

ERNEST W. SWIDER
Attesting Officer

EDWARD J. BRENNER
Commissioner of Patents